US010572360B2

(12) United States Patent
Chorley et al.

(10) Patent No.: US 10,572,360 B2
(45) Date of Patent: Feb. 25, 2020

(54) FUNCTIONAL BEHAVIOUR TEST SYSTEM AND METHOD

(71) Applicant: Autotestpro Limited, Torquay (GB)

(72) Inventors: Paul Chorley, Torquay (GB); Wayne Devonald, Torquay (GB)

(73) Assignee: Autotestpro Limited, Torquay (GB)

( * ) Notice: Subject to any disclaimer, the term of this patent is extended or adjusted under 35 U.S.C. 154(b) by 88 days.

(21) Appl. No.: 15/596,652

(22) Filed: May 16, 2017

(65) Prior Publication Data

US 2017/0329687 A1    Nov. 16, 2017

(30) Foreign Application Priority Data

May 16, 2016 (GB) .................................. 1608576.3

(51) Int. Cl.
 *G06F 11/00* (2006.01)
 *G06F 11/263* (2006.01)
 *G06F 11/36* (2006.01)
 *G06Q 10/06* (2012.01)

(52) U.S. Cl.
 CPC ........ *G06F 11/263* (2013.01); *G06F 11/3672* (2013.01); *G06F 11/3676* (2013.01); *G06F 11/3684* (2013.01); *G06F 11/3688* (2013.01); *G06Q 10/0633* (2013.01)

(58) Field of Classification Search
 CPC ............ G06F 11/0706; G06F 11/0718; G06F 11/3612; G06F 11/3636; G06F 11/366; G06F 11/3668; G06F 11/3672; G06F 11/3688

USPC ........................................................ 714/38.1
See application file for complete search history.

(56) References Cited

U.S. PATENT DOCUMENTS

| | | | |
|---|---|---|---|
| 9,032,259 B1 * | 5/2015 | Hood ................. | G06F 11/3692 714/57 |
| 2003/0163770 A1 * | 8/2003 | Webster ................ | G06F 11/36 714/47.1 |
| 2008/0270841 A1 | 10/2008 | Quilter | |
| 2009/0150287 A1 * | 6/2009 | Campbell ............. | G06Q 20/10 705/44 |
| 2010/0312542 A1 * | 12/2010 | Van Wyk ................ | G06F 8/10 703/22 |
| 2011/0131451 A1 * | 6/2011 | Bosch ................ | G06F 11/3672 714/33 |

(Continued)

*Primary Examiner* — Sarai E Butler
(74) *Attorney, Agent, or Firm* — Leason Ellis LLP

(57) ABSTRACT

A functional behaviour test system for a target computer program includes data defining user interface functionality encoded in a data repository. The test functional behaviour system includes a definition system arranged to receive, for the target computer program, a selection of a functional behaviour test definition, the definition system further being arranged to receive an input on one or more parameters for the selected behaviour test definition to define a functional behaviour test for the target computer program, a validation system arranged to validate the functional behaviour test in dependence on the data defining user interface functionality, a data repository to store the validated functional behaviour test, and a test interface system to provide access by a substantially automated execution environment to the validated functional behaviour test in the data repository for testing of the validated functional behaviour test against the target computer program.

20 Claims, 15 Drawing Sheets

(56) References Cited

U.S. PATENT DOCUMENTS

| | | | |
|---|---|---|---|
| 2011/0219273 A1* | 9/2011 | Nagata | G06F 3/01 |
| | | | 714/57 |
| 2014/0181629 A1* | 6/2014 | Hey | G06F 11/3672 |
| | | | 715/230 |
| 2015/0095716 A1* | 4/2015 | Beuchert | G06F 17/30985 |
| | | | 714/46 |
| 2015/0278075 A1 | 10/2015 | Loganathan | |
| 2016/0162456 A1* | 6/2016 | Munro | G06F 17/30011 |
| | | | 704/9 |
| 2016/0203000 A1* | 7/2016 | Parmar | G06F 9/4416 |
| | | | 713/2 |

* cited by examiner

Fig. 8

User Story Number: ATRUTS001614

User Story Description: Create Helpdesk Incident

| Task No. | Order | Task | Test Data |
|---|---|---|---|
| ATRUT0006794 | 10 | Login as 'ITIL User' | Itil |
| ATRUT0006795 | 20 | Navigate to 'Create New' Module | Create New |
| ATRUT0006796 | 30 | Type 'Aileen Smith' into the "Caller"... | Aileen Smith |
| ATRUT00067947 | 40 | Select the "1- Critical" choice | 1 |
| ATRUT0006798 | 50 | Type "My laptop is not working" | My Laptop is not working |
| ATRUT0006799 | 60 | Click on the "Submit" button or Link | Submit |

User Story: Create a new Helpdesk incident

Create a new helpdesk incident as a normal helpdesk user

1. Log-in as 'ITIL User'

2. Navigate to 'Create New' Module

3. Type 'Aileen Smith' into 'Caller' reference lookup field and select the 'Aileen Smith' option
Design considerations
When the user clicks on the Caller reference lookup it must:
1. Only display User records that are valid for this company
2. Only show User records that have a state of 'Active'

4. Type the text 'My laptop is not working' into the 'short description' field.

Test Run No.  ATRTR0002196

Name  Helpdesk Incident

Screen Capture  True

Raise Automated Defects  True

Escalate to SMS  False

Test Executions

| User Story No. | User Story Name | Story Status | No. User tasks |
|---|---|---|---|
| ATRUTS001614 | Create Helpdesk Incident | Unexecuted | 6 |
| ATRUTS001615 | Update Helpdesk incident | Unexecuted | 8 |

Fig. 14

Defect no  DFCT001470

State  Live

Description  Defect has occurred when trying to Select the 1-Critical choice from the 'Priority' choice lookup [Failure details – Field incident priority contains value 4]

Please see the attached screenshot

Fig. 15

| Test Run No. | Result | Start | End | Browser |
|---|---|---|---|---|
| ATECT0001743 | Passed | 2016-10-27 9:45:31 | 2016-10-27 9:46:51 | Chrome |
| ATECT0001744 | Passed | 2016-10-27 9:53:30 | 2016-10-27 9:53:55 | Chrome |

FUNCTIONAL BEHAVIOUR TEST SYSTEM AND METHOD

CROSS-REFERENCE TO RELATED APPLICATIONS

This application is based on and claims the benefit of priority under 35 U.S.C. Section 119 to Great Britain Patent Application Serial No. 1608576.3, filed on 16 May 2016, which is hereby incorporated by reference as if set for in its entirety herein.

FIELD OF THE INVENTION

The present invention related to a functional behaviour test system and method for computer software and systems.

BACKGROUND TO THE INVENTION

In the ideal world, a system will be created to cater for every eventuality and have no mistakes or unconsidered events. In the real world, mistakes and unexpected events happen.

Many computer software development systems offer assistance to a developer as software is being written. One way is via dynamic analysis.

Dynamic analysis (or dynamic testing) is a term used in software engineering to describe the testing of the dynamic behaviour of code. That is, dynamic analysis refers to the examination of the physical response from the system to variables that are not constant and change with time. In dynamic analysis, the software must be compiled and run. An error (either an exception or a spurious result) that arises at this stage is referred to as a run-time error. An exception, if handled properly in code may not even be seen by a user and may simply be logged or stepped over. Nevertheless, it is still desirable to eliminate such exceptions to avoid reduced functionality (the exception presumably occurred while the system was supposed to be doing something useful) or unintended consequences. Dynamic analysis tends to focus at relatively low levels of program functionality, dealing with variable settings and the like.

Unit Tests, Integration Tests, System Tests and Acceptance Tests are a few of the existing dynamic testing methodologies. Dynamic testing typically means testing based on specific test cases by execution of the test object or running programs.

Just because a computer program passes dynamic testing does not necessarily mean it is free from issues. One area that is difficult to test with dynamic testing is functional behaviour such as: how an interface reacts to user inputs; or what happens when the program is in a particular state (such as user logged on or not logged on) and a specific action is performed. Actions may be non-user specific and concerned with the environment and/or inputs from external systems.

SUMMARY OF THE INVENTION

According to an aspect of the present invention, there is provided a functional behaviour test system for a target computer program, the target computer program including data defining user interface functionality, the test system including:

a definition system arranged to receive, for the target computer program, a selection of a functional behaviour test definition, the definition system further being arranged to receive an input on one or more parameters for the selected behaviour test definition to define a functional behaviour test for the target computer program;

a validation system arranged to validate the functional behaviour test in dependence on the data defining user interface functionality;

a data repository to store the validated functional behaviour test;

a test interface system to provide access by a substantially automated execution environment to the validated functional behaviour test in the data repository for testing of the validated functional behaviour test against the target computer program.

Preferably, the functional behaviour test comprises a user scenario and is defined with respect to a user input, the test system being arranged to translate the user scenario into one or more actions to be performed by the substantially automated execution environment to simulate the user input and communicate said one or more actions to the substantially automated execution environment to test the target computer program.

Preferably, the functional behaviour test system is arranged to manipulate the actions communicated to the substantially automated execution environment to cause non-standard execution associated of an aspect of the target computer program associated with the validated functional behaviour test.

Preferably the non-standard execution comprises changing emphasis of user interface functionality to highlight the user interface functionality associated with the validated functional behaviour test.

Preferably, the functional behaviour test system is configured to store a screen capture of the highlighted user interface functionality in association with the validated functional behaviour test. The screen capture may be stored in the repository or elsewhere.

Preferably, the functional behaviour test is defined with respect to an expected response, the test system being arranged to translate the expected response into one or more outputs or actions to of the target computer program to be monitored or measured by the substantially automated execution environment when executing target computer program.

Preferably, the functional behaviour test system includes the substantially automated execution environment, the substantially automated execution environment being configured to execute the target computer program in a virtual environment.

The functional behaviour test system may include a machine learning unit configured to monitor user interaction with a live environment executing the target computer program and generate functional tests in dependence on the user interaction.

The functional behaviour test system may include a documentation system arranged to translate one or more of the validated functional behaviour tests in the repository into user-oriented documentation and to generate one or more documents on the target computer program using the user-oriented documentation.

Each validated functional test may be based on a template having an associated natural language format, the documentation system being arranged to apply the natural language format to the validated functional test to generate the user-oriented documentation.

The documentation system may be arranged, in generating the user-oriented documentation, to combine the validated functional behaviour test with one or more results from testing the validated functional behaviour test against the target computer program. The results may include one or more screen captures of the target computer program being executed by the substantially automated execution environment.

Preferably, the definition system is arranged to access a data repository on acceptable parameters of the target computer program and constrain the input on the one or more parameters to one or more of the acceptable parameters.

The functional behaviour test system may include an alarm system, the functional behaviour test system being arranged to repeatedly execute one or more of the validated functional behaviour tests, the arranged to generate an alarm upon a change in state of execution of the validated functional behaviour test from successful to unsuccessful. In selected embodiments, the test system has one or more tests associated with a successfully operating system/computer program—should that test change from success to fail, an alarm can be generated to identify failure of an underlying system, an inappropriate change by a developer etc.

According to an aspect of the present invention, there is provided a method for testing functional behaviour of a target computer program, the target computer program including data defining user interface functionality encoded in a data repository, the method including:

receiving, for the target computer program, a selection of a functional behaviour test definition;

receiving an input on one or more parameters for the selected behaviour test definition to define a functional behaviour test for the target computer program;

validating the functional behaviour test in dependence on the data defining user interface functionality;

storing the validated functional behaviour test in a data repository;

providing one of the validated functional behaviour tests to a substantially automated execution environment via an interface that translates the validated functional behaviour tests to instructions executable by the substantially automated execution environment against the target computer program for performance of the test.

In embodiments of the present invention, functional behaviour tests can be defined for target computer programs, systems and the like. The target computer program need not be an executable binary—it could be interpretable code or mark-up or it could be data defined in one or more database tables that when interpreted by a host system causes the host system to operate in a particular way, have a particular user interface etc. Many content management systems, websites and the like fall into this latter category and can be tested by embodiments of the present invention. Functional behaviour tests are defined and validated with reference to known data on user interface functionality such that they are constrained to possible actions that may occur within the target computer program. In this way, only plausible tests can be defined and there is not the combinatorial explosion of test permutations that other systems may offer/suggest.

The functional behaviour test may be executable by the substantially automated execution environment to test the target computer program. Alternatively, or in addition, it may be interpreted or compiled by the test interface system and/or the substantially automated execution environment for execution of the functional behaviour test.

The data repository may store a plurality of validated functional behaviour tests. The data repository may store dependencies between the tests including ordering and tests to be applied against combinations.

Preferably, the functional behaviour test system further includes or is arranged to interface with a documentation system arranged to generate documentation on the target computer program in dependence on one or more of the validated functional behaviour tests. The documentation system is preferably substantially automated. Preferably the documentation system is arranged to interpret the validated functional behaviour tests in combination with data associated with the functional behaviour test definition to generate documentation on the target computer program.

The documentation system is preferably arranged to combine the interpreted functional behaviour tests with one or more templates associated with the respective functional behaviour test definition.

Optionally, the documentation system is arranged to generate the documentation in dependence on results of one or more tests by the substantially automated execution environment using the validated functional behaviour test against the target computer program.

Optionally, the documentation system is arranged to generate the documentation in dependence on the data defining user interface functionality.

Preferably, the documentation system is arranged to generate the documentation in dependence on the dependencies.

The data defining user interface functionality is preferably encoded in a database. The data defining the user interface functionality may be on the target computer program or it may be the target computer program.

The selection may comprise a selection of one of a plurality of structured rules to be parsed to check functional behaviour of the target computer program when subject to user interaction.

A user may be a physical user, a remote user and/or system or some external service that interacts with the target computer program.

The user interface may be any form of user interface including a graphical or non-graphical user interface, a touch user interface or a speech user interface. It may not only be action actively instigated by a user that are subject of tests—for example, it may include passive tests and/or tests on how a user interface that reacts to properties of a user or the environment (such as presence, movement, temperature, sound, light, inactivity, health, heart-rate, financial status, messages received, capacity left in a data store etc).

Embodiments of the present invention are directed to a method and system which enable defining and testing, in a structured and repeatable way, the functional behaviour of interaction with a software application (and preferably but not exclusively that of a user). The definitions produced by embodiments advantageously facilitate automated creation of common software development lifecycle (SDLC) documentation artefacts and also form at least part of an input to automatic execution environments that executes the tests and checks that the application behaves as required.

Preferably, embodiments enable a way of defining the user's desired interaction with a computer system or program such as a software application in the form of a sequence of structured 'user task instructions' and the resultant desired results of the user having carried out that user task instruction (the instructions and results all having formats selected from a predefined set).

Preferably, embodiments also define a way in which the user task instructions can be used to produce a number of documents commonly produced during the software development lifecycle process, such as user requirements documents (such as user stories used in the SCRUM software development methodology), user training material, design and software configuration documents for developers, common testing documents and knowledge base articles.

The user task instructions can be used for automated or robotic testing of the software application being defined. Preferably, the user task instructions are fed into an automated software testing software computer program, such that they are executed in a defined sequence and the testing software program checks that the desired results defined are either returned or not returned (i.e. the test has either passed or failed).

BRIEF DESCRIPTION OF THE DRAWINGS

Embodiments of the present invention will now be described in detail, by way of example only, with reference to the accompanying drawings in which:

FIGS. 4 to 9 are illustrations of aspects of operation of a functional behaviour test system according to one embodiment;

FIGS. 10 and 11 are illustrate aspects of lifecycle documents generated by embodiments of the present invention;

FIGS. 12 to 15 illustrate aspects of operation of a preferred embodiment of the present invention.

DETAILED DESCRIPTION OF CERTAIN EMBODIMENTS OF THE INVENTION

Figure 1:
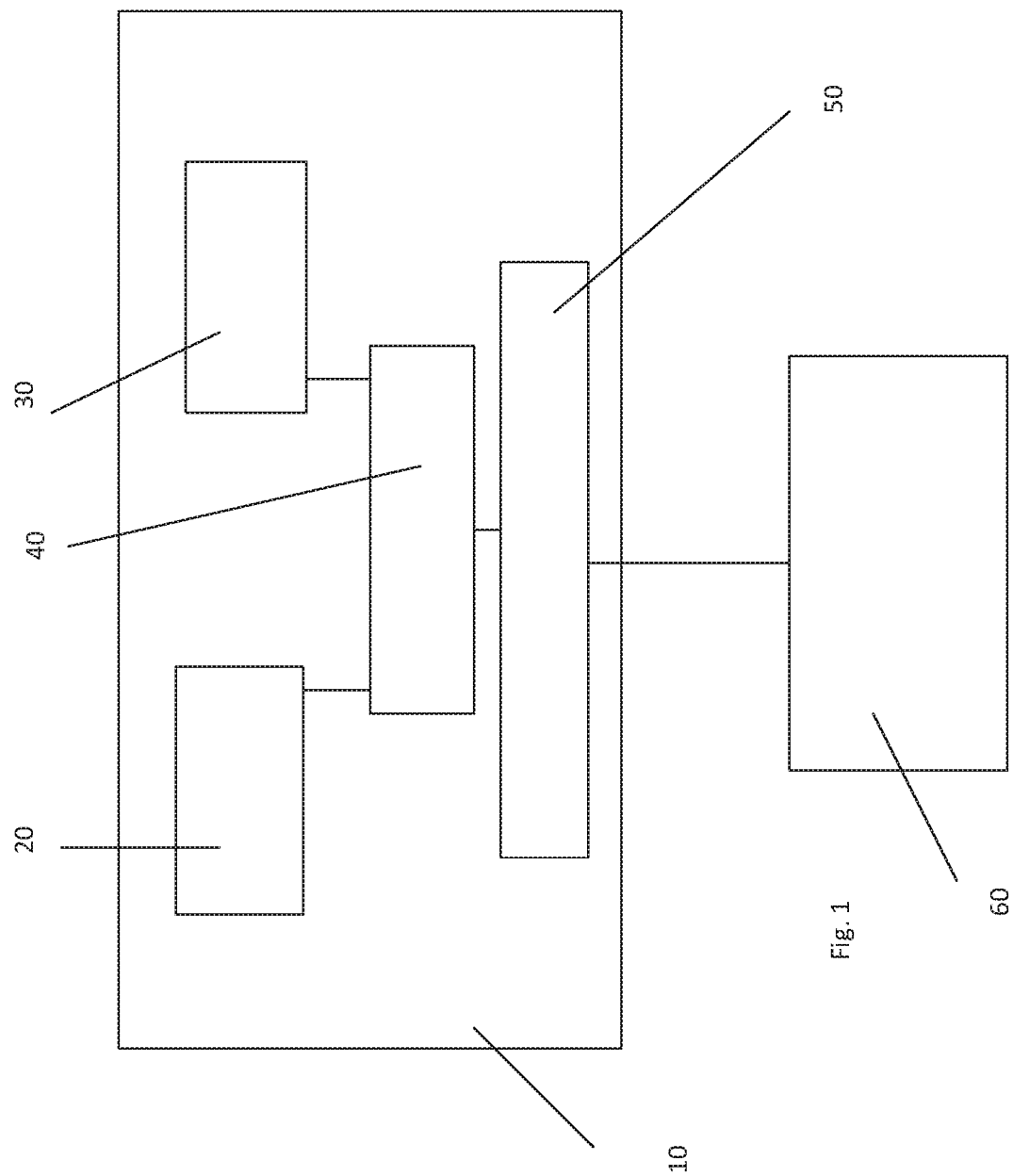
FIG. 1 is a schematic diagram of a functional behaviour test system 10 according to an embodiment of the present invention.

FIG. 1 is a schematic diagram of a functional behaviour test system 10 according to an embodiment of the present invention.

The functional behaviour test system 10 is configured to test a target computer program. The target computer program includes data defining user interface functionality.

The test system 10 includes a definition system 20, a validation system 30, a data repository 40 and a test interface system 50.

The definition system 20 is arranged to receive, for the target computer program, a selection of a functional behaviour test definition. Each functional behaviour test definition has a predetermined structure. The definition system is further arranged to receive an input on one or more parameters for the selected behaviour test definition. The selected test definition and parameter(s) define between them a functional behaviour test for the target computer program.

A test definition and its parameters typically form a template. For example, there may be a template for a test to perform a navigation action, the parameters being the target to be selected to be navigated to. These templates are stored in the data repository. In some cases, the templates may be dynamic and some of the parameters may depend on other parameters selected. For example, an "input" template for prompting an input via a user interface may vary the parameters that are to be provided for inputs depending on the input fields that the program being tested requires for that input (so, for example, a user interface requiring three fields to be completed would have three parameters, a user interface requiring five fields having five parameters etc). Parameters themselves are preferably constrained where the underlying field is limited—for example, the system may access an associated database to determine possible user inputs. A user field would, for example, be limited to accept only valid user names appearing in a username table of an associated database whereas a free text entry "problem" field's corresponding parameter would freely accept any (or no) text.

The validation system 30 validates the functional behaviour test in dependence on the data defining user interface functionality. In this way, only possible circumstances/behaviours can be the subject of tests being defined. Preferably, the validation system 30 validates the test as it is defined in the definition system 20. This may be done at the time the test is saved or otherwise submitted or it may be done as the test is being entered. As discussed above, validation cross-references the target computer program or systems associated with it (such as database tables storing configuration information) to offer parameter selections predetermined to be valid and/or validate that the parameters selected as being possible/reachable by the target computer program. In another example, certain menu options may only be made available to a user once logged on, the system would therefore differentiate menu choices and only offer those menu choices as parameters in a "navigate to" test if a successful "log on" action test preceded it.

The data repository 40 is arranged to store validated functional behaviour tests. These may be immediately executed, combined with others as a test run, scheduled for execution at one or repeated future times or events or it may simply be stored for future reference as a "building block".

The test interface system 50 provides access by one or more substantially automated execution environments 60 to the validated functional behaviour tests in the data repository 40 for testing of the validated functional behaviour test against the target computer program. A substantially automated execution environment may be part of the functional behaviour test system 10 or it may, as illustrated, be an external application, system or service which is called upon via the test interface system 50. In this way, different execution environments 60 may be substituted with each other and/or called upon depending on what is being tested. Execution environments may vary, for example depending on the platform to be tested (one that tested Joomla may be different from one that tested SharePoint®, for example). Execution environments may also provide different functionality and one or multiple systems may be selected depending on what is to be tested. Should test be based on responsiveness or other timed factors, multiple execution environment may be used and results averaged or weighted.

It will be appreciated that the functional behaviour test may be executable by the substantially automated execution environment to test the target computer program.

Alternatively, or in addition, it may be interpreted or compiled by the test interface system and/or the substantially automated execution environment for execution of the functional behaviour test. For example, the test interface system 50 may take the tests that may be defined in a structured language and identify to the execution environment how they apply to assets of the computer program such as html defined entities. The execution environment may understand menu items and their html identifiers but may not be able to correlate that to the "paste" action under the "edit" menu that a particular test calls to be navigated to. The test interface system 50 may provide that level of translation (and in all likelihood, may have to translate differently depending on the target execution environment being used).

Where the data repository 40 stores a plurality of validated functional behaviour tests, dependencies between the tests may also be defined and stored. For example, dependencies may include ordering of tests and/or combinations of tests to be collectively applied in, for example, some logical AND/OR/XOR/NOT type combinations.

The data defining user interface functionality is preferably encoded in a database such as the data repository 40. The data defining the user interface functionality may be data about the target computer program or it may be the target computer program. The data may be obtained from a programming environment associated with the computer program, it may be obtained from the program itself and/or it may be obtained from systems and assets used in the execution of the program such as databases, script files etc. In the case of computer programs developed in relatively low-level programming languages/environments, an extra layer of data defining the user interface functionality may be needed for translation between low-level concepts and the structured language of the tests. In the case of computer programs defined in substantially database driven systems such as ServiceNow and Content Management Systems, the needed level of definition of user interface functionality may exist in a database or data repository and may be accessed directly.

The selection may comprise a selection of one of a plurality of structured rules to be parsed to check functional behaviour of the target computer program when subject to user interaction. Preferably, the rules are divided into action rules and check rules which are associable with action rules as is explained in more detail below.

A user may be a physical user, a remote user and/or system or some external service that interacts with the target computer program.

The user interface may be any form of user interface including a graphical or non-graphical user interface, a touch user interface or a speech user interface. It may not only be action actively instigated by a user that are subject of tests—for example, it may include passive tests and/or tests on how a user interface that reacts to properties of a user or the environment (such as presence, movement, temperature, sound, light, inactivity, health, heart-rate, financial status, messages received, capacity left in a data store etc).

In a preferred embodiment, rather than simply relying on standard functionality of an execution environment, tests provided via the test interface system 50 manipulate how the execution environment 60 operates.

In a preferred embodiment, the test interface system (or another component of the system 10) manipulates the program under test so as to emphasise certain aspects of the user interface. Preferably, the test interface system 50 causes the subject/target of the test to be highlighted and then causes image capture (static images or video) of the test so that the subject/target can be readily recognised and the outcome visually seen by a user.

Preferably, the execution environment 60 executes the program under test in a virtual environment and emulates user interaction and outputs that would occur should the program under test be interacted with on a computer system by a user in the way the test indicates. For example, testing a "navigate to" action for a menu option may involve executing the program in a virtual environment, optionally showing movement of a cursor, showing activation of the menu when the cursor is in the correct position and how the interface changes upon selection of the menu option. Each of these stages could be captured as an image or a video may be captured.

Where the test interface system manipulates the program under test, it may inject code, mark-up or the like into the program under test so as to cause the highlighting or emphasis. For example, in the case of HTML being passed to the execution environment 60 to test, mark-up associated with a button may be changed to cause highlighting of the button when the execution environment 60 renders the html.

Preferably, functional behaviour tests define user scenarios. These may have varying levels of granularity but would typically be defined with respect to specific user interface controls—for example "enter XXX in a text box", click button Y, navigate to menu option Z, etc. User scenarios preferably also define expected outcomes—after clicking button Y what should happen etc. so that a test can be said to have been passed or not. It will be appreciated that in many cases simply being able to perform the action may be a "pass".

The test system is preferably arranged to translate the user scenario into one or more actions to be performed by the substantially automated execution environment to simulate the user input and communicate said one or more actions to the substantially automated execution environment to test the target computer program. Likewise it is preferably arranged to translate expected outcomes to ones that can be measured/captured by the substantially automated execution environment (or some other component whose job it is to monitor the substantially automated execution environment).

Figure 2:
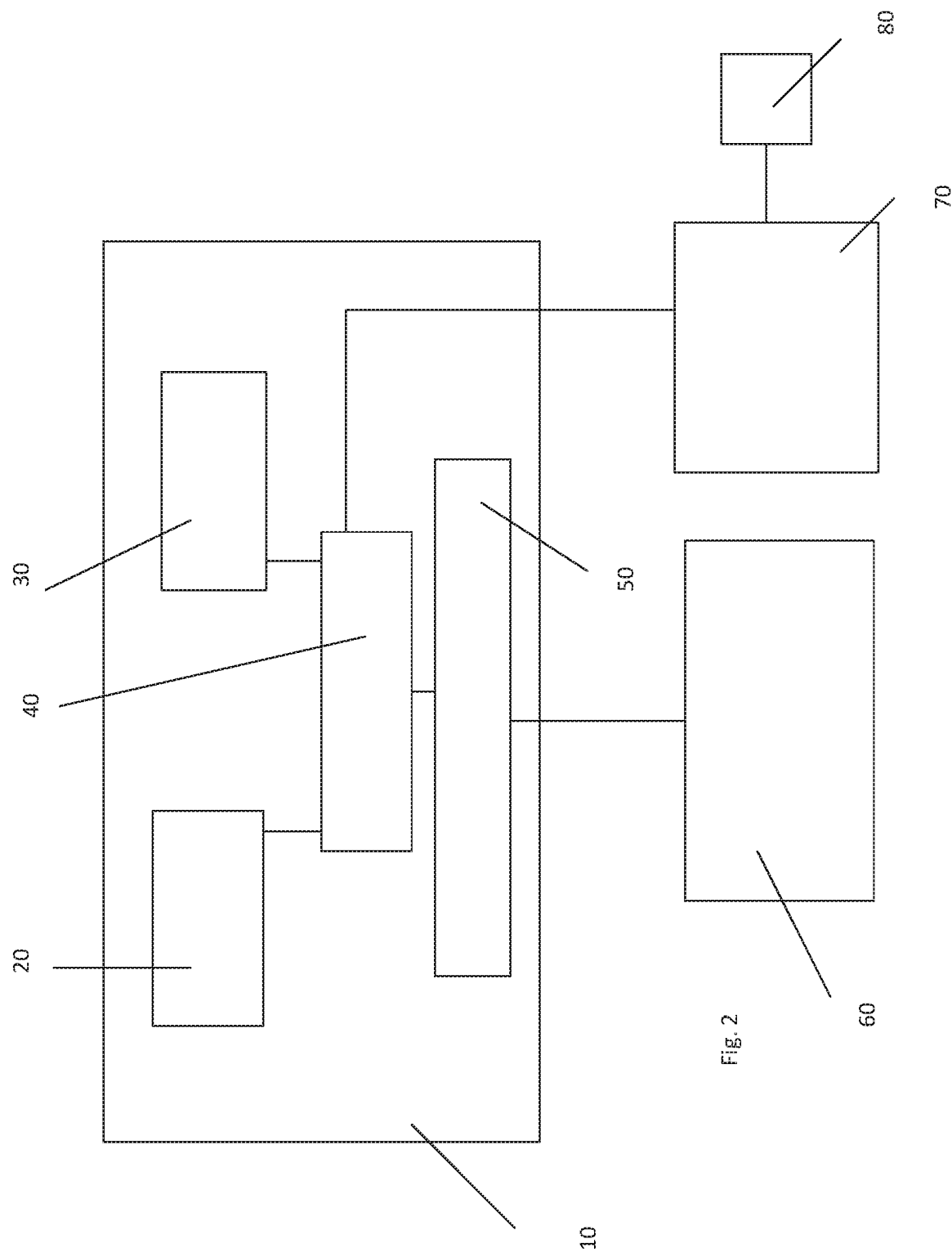
FIG. 2 is a schematic diagram illustrating aspects of a preferred embodiment of the present invention.

FIG. 2 is a schematic diagram illustrating optional preferred aspects of the embodiment of FIG. 1.

Preferably, the functional behaviour test system 10 further includes or is arranged to interface with a documentation system 70.

The documentation system 70 is arranged to generate documentation on the target computer program in dependence on one or more of the validated functional behaviour tests in the repository 40. The documentation system is preferably substantially automated.

Documentation may, for example, take the form of documentation intended for users (user guides, training documents, user stories etc), they may be intended for software development (design documents, data model design) or they may be intended for other systems associated with the target program (test cases, results of tests, exceptions to be logged).

Preferably the templates and/or template components used when defining the tests are defined and stored in a template store 80. Each test definition is preferably associated with one or more templates or template components in the template store 80. The documentation system 70 is arranged to interpret the validated functional behaviour tests along with data associated with the functional behaviour test definition to generate documentation on the target computer program. Preferably, in addition to definition of aspects of tests, the templates or template components also define aspects to be included in documentation. For example, a template for a "populate text box" action may not only tell the execution environment 60 (via the test system interface 50) the text box to populate and what to populate it with, it may also tell the documentation system 70 the language to insert to describe the test action when compiling the user guide, for example. In this manner, not only do tests form the underlying benchmark on whether a computer program is fit for purpose (i.e. it functionally does what is intended), the tests can also be translated into documentation and other actions that demonstrate the expected and tested performance of the tested target program. Combining testing and documentation reduces overhead and possible errors or omissions. Additionally, it means that the documentation can draw on outputs of the testing system 60 as screenshots (highlighted to show the user interface feature under discussion), resultant behaviour of the target program etc can all be incorporated automatically into the documentation. Where there is an exception, as well as being of use in the documentation, the exception can be logged with screen shots and the failed test in question identified so it can be re-executed when the developer claims the issue causing the exception As discussed above, preferably the documentation system generates the documentation in dependence on results of one or more tests by the substantially automated execution environment 60 using the validated functional behaviour test against the target computer program.

Optionally, the documentation system is arranged to generate the documentation in dependence on the data defining user interface functionality.

Preferably, the documentation system is arranged to generate the documentation in dependence on the dependencies of the tests—in this way, the tested user journey reflects the user manual etc and the progression of the user manual should be logically laid out and not skip between unrelated features of the target program.

Preferably, functional behaviour test is defined using a common language and structure. Each test preferably includes at least one action and at least one result being checked. Preferably, actions and checks are defined separately and associated but it will be appreciated that this need not be the case.

For example, an action may have the basic form:
User (or other entity) takes an action→to a user interface component→with some data.

A check may have the basic form:
Check that something has happened→to a user interface component→with the data provided It will be appreciated that multiple checks can be defined and linked (and for that matter multiple actions such that certain checks or actions may only be processed under certain circumstances (or in certain circumstances they may always be checked in parallel)).

Any number of 'check' instructions may be defined for a given user action, indicating that multiple desired results must be returned in order for the user task to have been deemed successful or passed testing.

Embodiments seek to define a means by which desired user task behaviour and desired outcomes are defined in a structured user task instruction language consisting of a set of pre-defined well-structured and sequenced instructions which are validated against the program or system which is being configured or tested.

Figure 3:
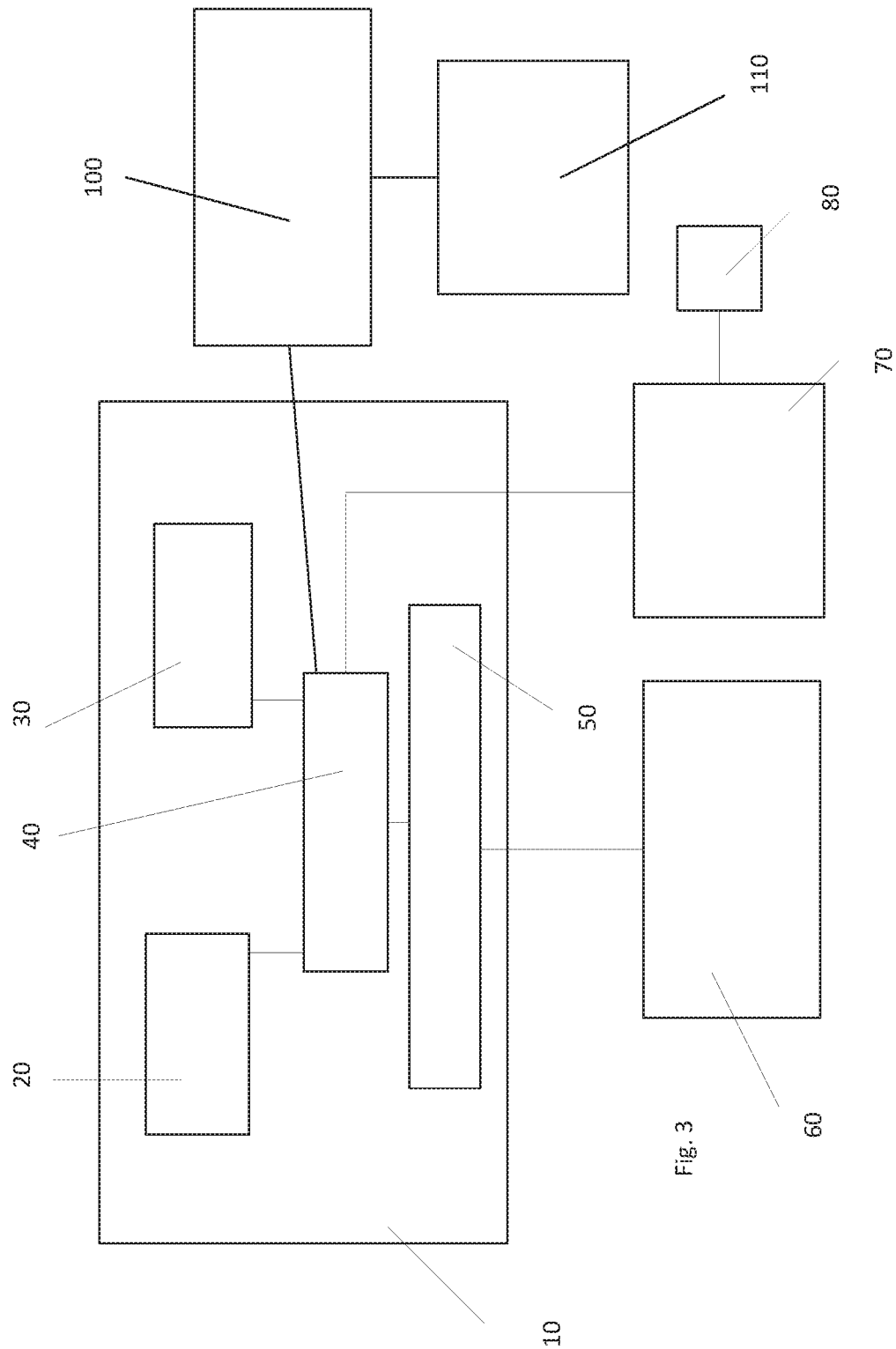
FIG. 3 is a schematic diagram illustrating preferred aspects of the embodiment of FIG. 1.

FIG. 3 is a schematic diagram illustrating aspects of a preferred embodiment of the present invention.

The embodiment of FIG. 3 has much in common with that of FIGS. 1 and 2 and could be combined to provide functionality of the three systems should it be desired. However, rather than providing for user input of test definitions, a machine learning unit 100 is arranged to monitor user interaction with a live environment 110 executing the target computer program/system and determine functional tests in dependence on the user interaction. In this way, tests are determined and/or developed from real-time live user interaction with the system and can be further extrapolated as desired by the machine learning unit 100. The resultant tests can then be tested to identify exceptions but it can also be used to monitor correct operation. In many systems, the live environment may be subject to modification and having a suite of tests for regularly used activities against which the modified computer system/program can be tested is particularly beneficial; and can be used to warn a developer who may inadvertently "break" the system.

The machine learning unit may use a neural network, genetic algorithm, decision tree or other supervised or unsupervised learning approach. The machine learning unit 100 produces tests based on observed user behaviour and populates the data repository 40 accordingly. Further functionality corresponds to that of the embodiment of FIG. 1. It will be appreciated that the formulation of tests may be wholly manual, wholly automated or a mix of the two.

Figure 4:
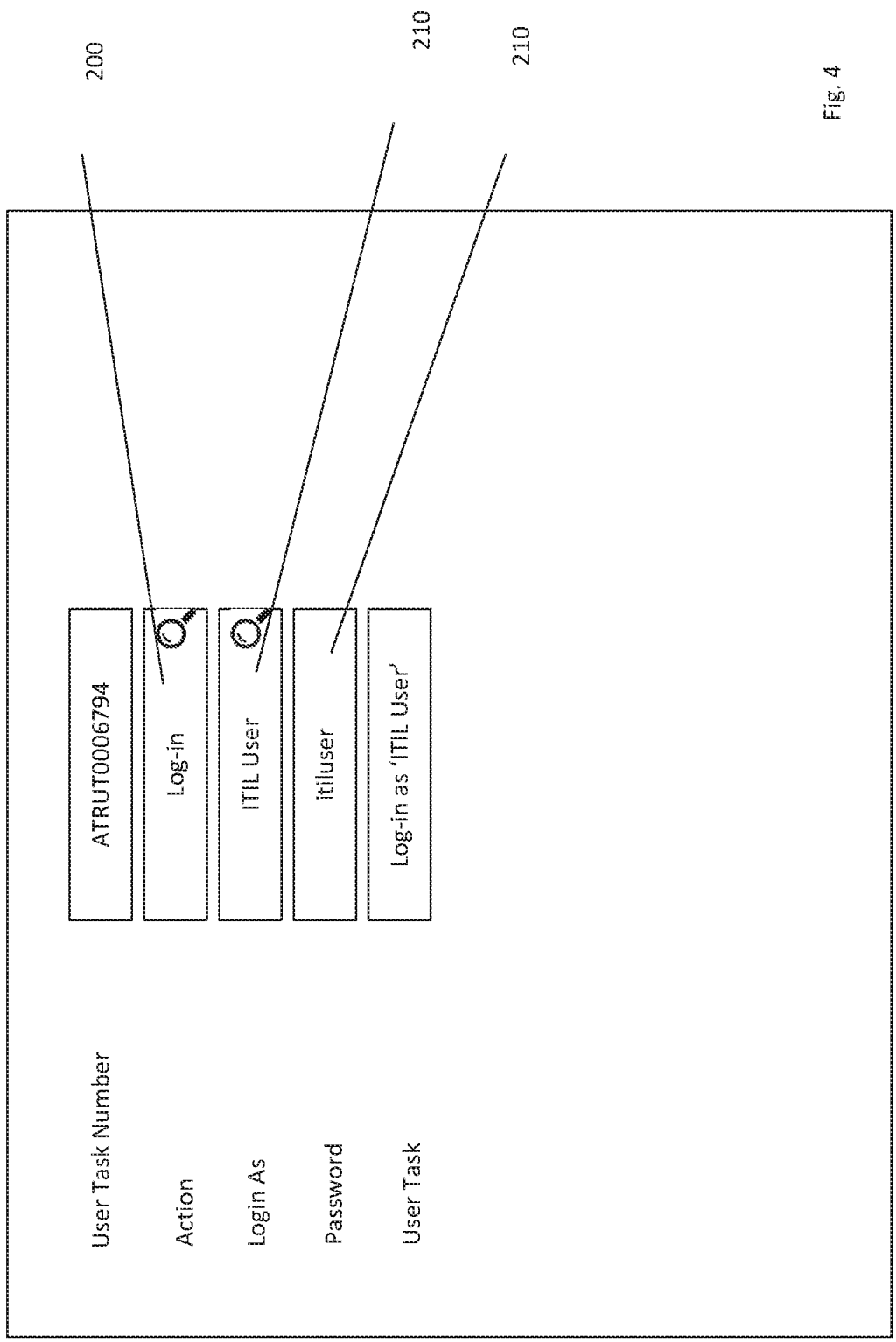
Figure 5:
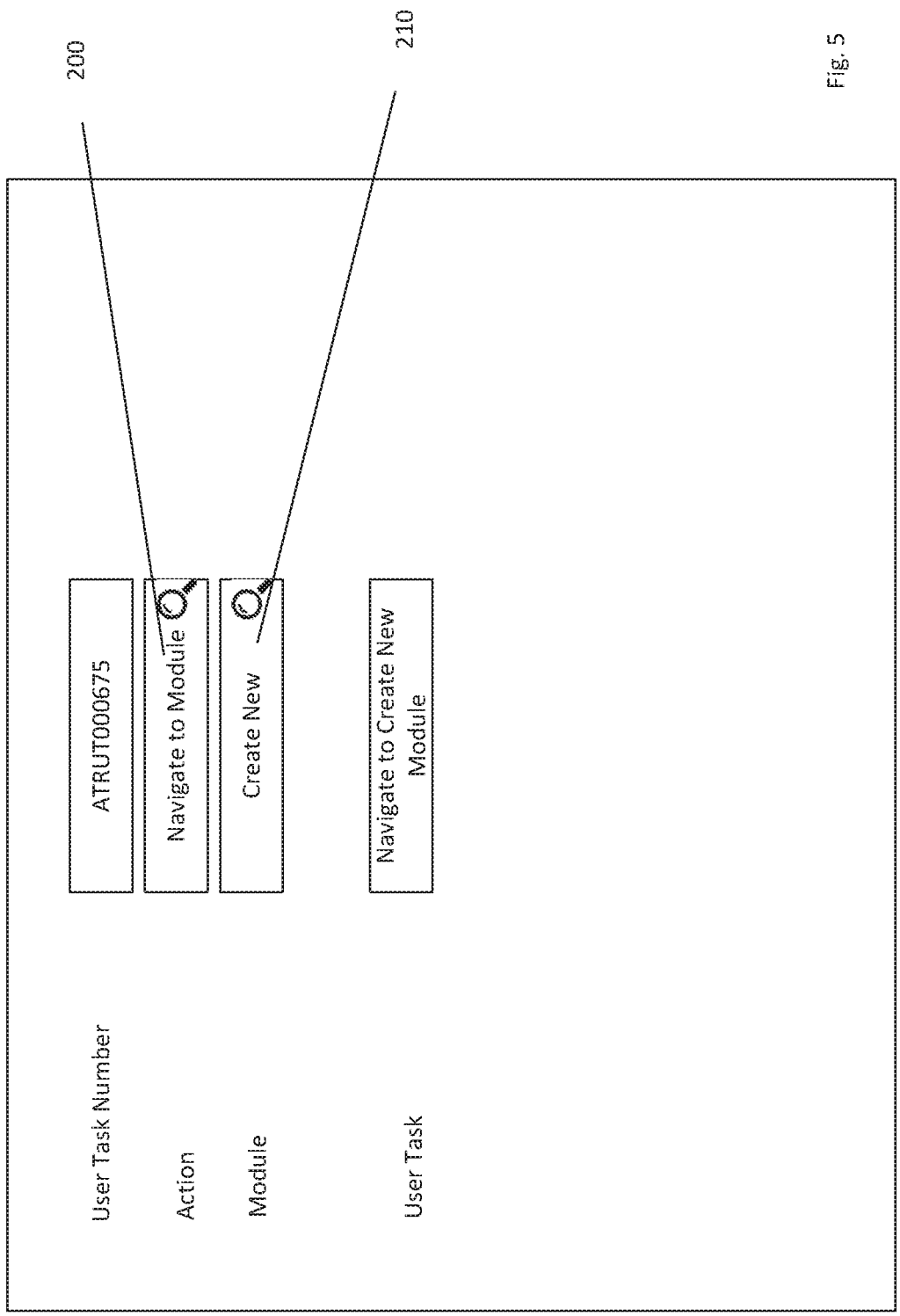
Figure 6:
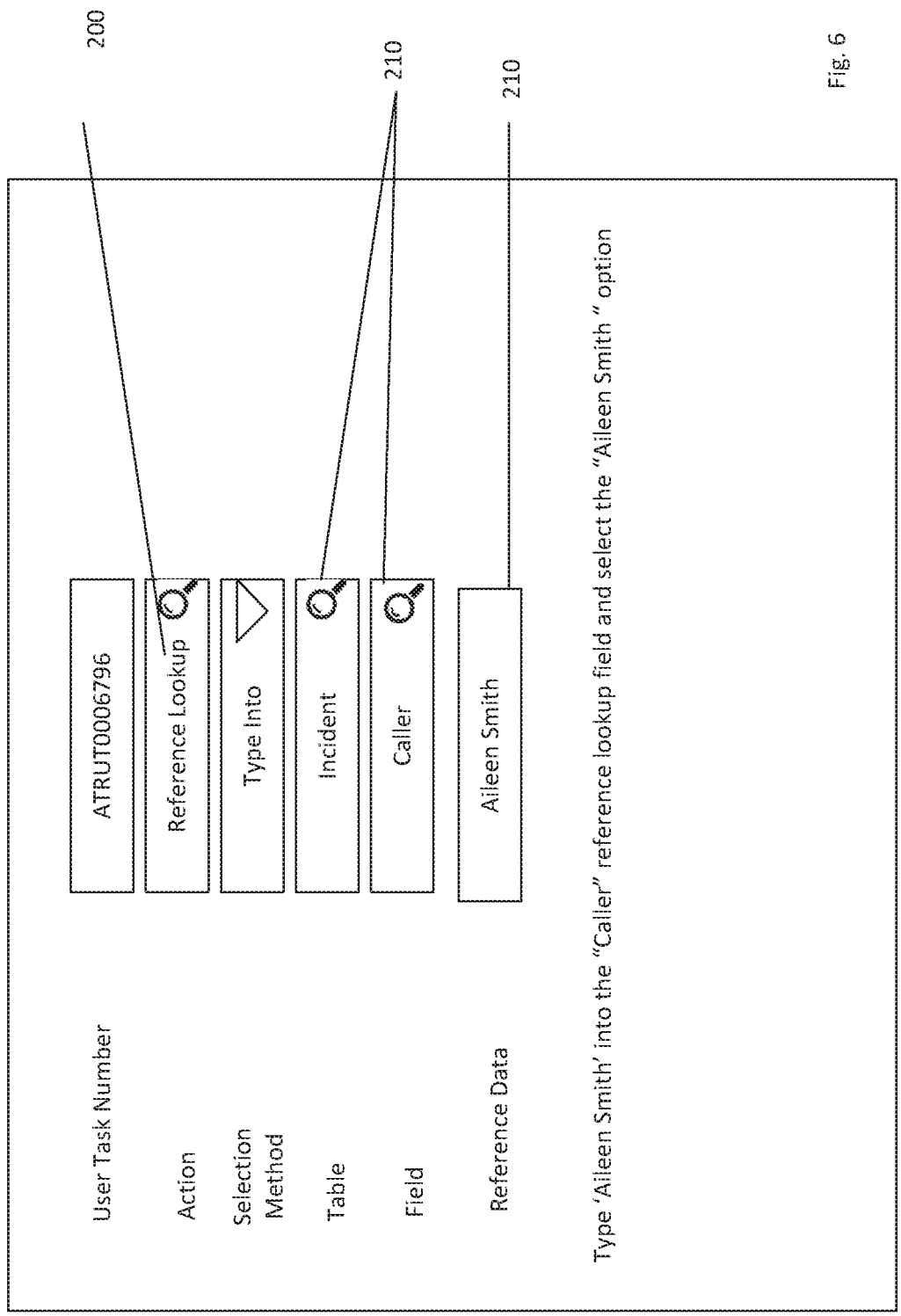

FIGS. 4 to 6 are illustrations of aspects of a user interface for a functional behaviour test system according to one embodiment. When executing the test system (such as that of FIGS. 1, 2 and/or 3) against a program, a user is able to specify a number of tests as detailed below.

For each test, a user selects an action 200 to be taken. In FIG. 4 this is "log-in", in FIG. 5 it is "navigate to" and in FIG. 6 it is "reference lookup". It will be appreciated that many different actions can be available to the user to specify. Additionally, these could be used multiple times to form different tests as part of a bigger overall test plan. Preferably, availability of actions is limited by the functionality of the program—for example if the program does not offer the ability to log-in then that action would not be offered.

Depending on the action selected, the appropriate template is obtained from the repository and parameters determined. Input fields 210 corresponding to the parameters that are appropriate for the action are then shown, as shown in the respective Figures.

Figure 7:
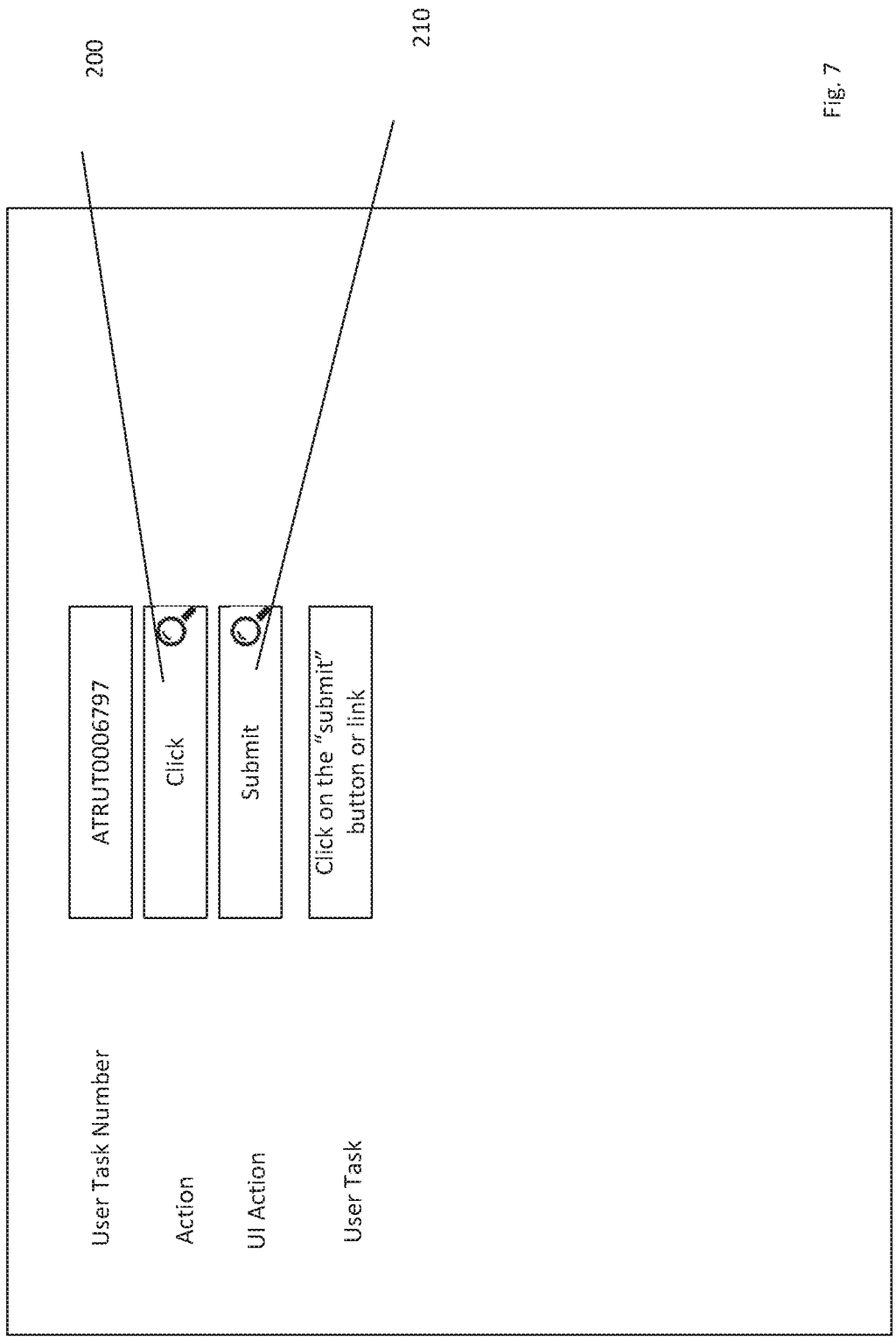

It should be noted that test activities may also be for actions such as button presses as shown in FIG. 7 which test the 'click' action on the submit button.

Once a test is defined by entry of the parameters, it can be saved to the repository. An overall test plan, part of which is illustrated in FIG. 8, is built. The test plan can be added to, modified and reordered as needed.

The templates preferably include, or have associated with them, a natural language template that translates tests into documents such as the user story shown in FIG. 9. When a document is requested, the corresponding natural language template for each test is retrieved and populated with parameters for the test before being combined into the output document.

Test runs for a test plan, or part of a test plan, can also be executed or scheduled, as shown in FIG. 10. Preferably, test runs can be selected to include automated screen captures, raise automated defects as discussed in detail below. Options such as user designated to receive defects and whether to escalate defects to SMS may also be selected.

It will be appreciated that the user task and check tasks are illustrated by way of example only and further or alternative tasks may be used as needed.

When the processes above are followed, they result in a structured and pre-validated set of instructions being created which can be used in a number of ways, including for automated testing purposes.

In the example below, a set of User Task records and User Task Check records have been created to test a system correctly creates a helpdesk call record:

| Seq | Take this Action | New field? | On what | With what data | Check that | On what | Description |
|---|---|---|---|---|---|---|---|
| 1 | Login | | Login screen | Username of helpdesk.user Password of abc1234 | User is logged in | | User with helpdesk role. |
| 2 | Navigate to | | 'Create Incident' menu | 'Create Incident' | The 'Create Incident' screen is displayed | | This menu option is within the 'Incident' module. |
| 3 | Select from drop down | | 'Caller' selection field | 'Sam Sorikin' | 'Sam Sorikin' is selected | In the 'Caller' field | The 'Caller' field shows all valid users that can raise incidents. If the Caller does not exist, the user will need to be created (STORY0283) |
| 4 | Select from drop down | New | 'Criticality' | 'Urgent' | 'Urgent' is selected | In the 'Criticality' field | Valid options are: Urgent Important Non-urgent |
| 5 | Enter text into a field | | 'Short Description' field | 'This is an incident' | 'This is an incident' | Is entered into the 'Short Description' field | Enter a short description for this incident. This is shown in list views of incidents and is searchable in the knowledge base. |
| 6 | Click | | 'Submit' button | 'Submit' | A new incident is created | | Once all details are entered for this incident, click the Submit button which will save the incident. |
| 7 | Click Logout | | Screen banner section | 'Logout' | User is logged out | | |

In this example, a pre-defined set of user actions are considered for tests such as login, navigate to, select from a drop-down box etc. This ensures that only valid actions for the application being defined can be used. When these instructions are passed to the automated test program, the test interface system 50 translates them in such a way that informs the program how to perform this user action and what to check having done it.

Aspects of the tests such as user task instructions can be used to create common SDLC document artefacts allowing a computer program to form these documents automatically.

Figure 11:
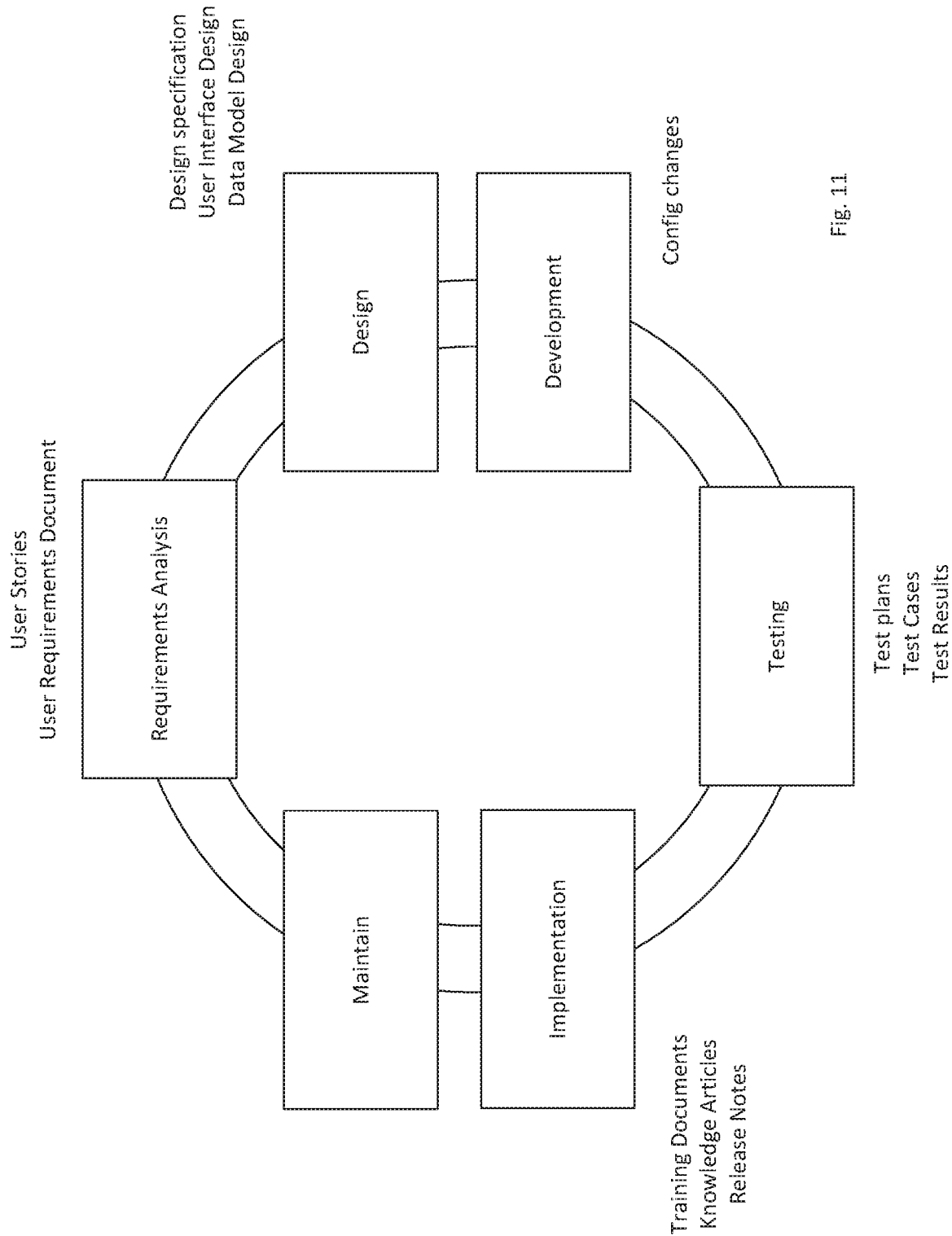

FIG. 11 is an example of a common SDLC and the document artefacts that may be produced by the system 10 during each stage.

Preferably, the SDLC document artefacts are automatically produced using the defined structured user tasks. The system may automatically produce a set of structured test instructions which form the input into a computer program that automatically executes the user actions (as though being performed by an actual human user) and makes the checks as defined in the user task instructions, and recording the results of these checks.

Using the system 10 to define tests, a number of common SDLC document artefacts can be produced and the system can automatically manipulate the test definitions and templates to produce different content and formats dependent on each document type.

In one embodiment, the test system 10 resides in an environment called ServiceNow. A separate test automation system (the test system interface) reads the user task instructions, carries out the checks and passes the results back to be recorded against the user task instruction by the test system 10.

ServiceNow is a business software as a service application used by more than 10,000 customers across the world. It allows customers and users of the system to build their own business applications using a set of provided functions and components. ServiceNow provide a number of pre-built business applications which perform common functions and customers are able to customize these and build their own business applications using the ServiceNow framework.

It is common for customers of ServiceNow to configure and customize the pre-built applications so that they match their exact business requirements. ServiceNow have made it very quick and easy to for customers to do this. However, customers find it time-consuming and labour intensive to test that the changes they have made work as expected and have had no unexpected impacts. A further issue is that modifications are typically applied to live environments.

Most customers who modify and configure ServiceNow follow a traditional Software Development Lifecycle or Agile SCRUM method to define, design, test and implement the change. It is time consuming and labour intensive to create these documents and maintain them when the configuration of ServiceNow changes.

Using the above-described system 10 and method, once the sequence of user task instructions has been created in the test system 10 (which in this embodiment is implemented as a ServiceNow module), tests can be executed as a one-off or periodically/repeatedly. Tests can also be triggered by changes, for example the service now database for the application can be monitored and test plans triggered upon detection of a change of the application. Test plans may be run to produce SDLC documents as discussed above (so a user manual could be automatically updated when an application is detected to have changed, for example). Documents can be produced at the click of the mouse and tested using an automated testing program designed to be used within the method.

Figure 12:
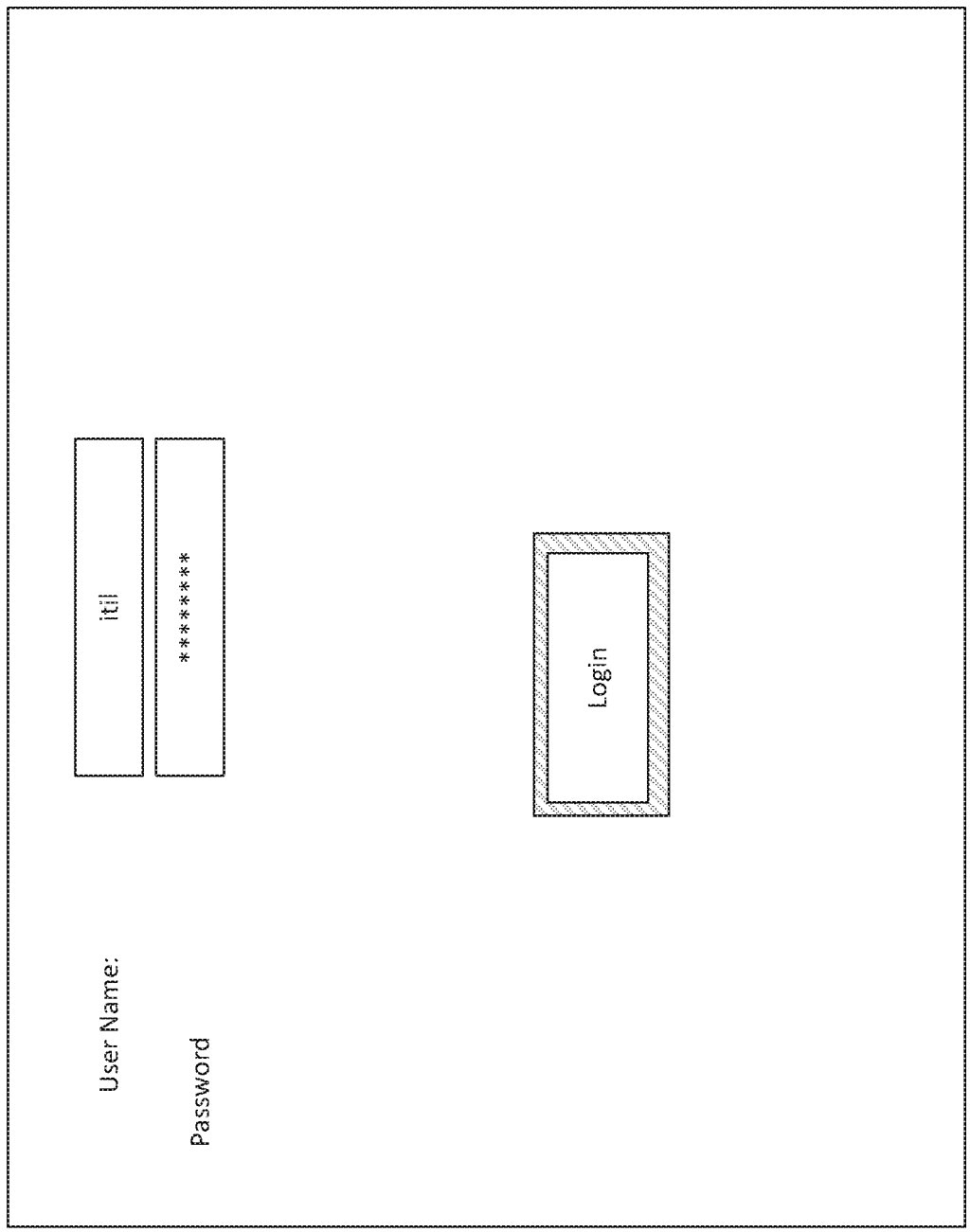

As discussed above, one option provided for test plans is automated screen capture. As the test engine executed each user task, it highlights the area of the user interface of the application it is interacting with (button clicked, text field entering text into etc. Each screenshot is stored against the task in the data repository and used alongside the natural language template and parameters when compiling document outputs (which may be a report on the tests themselves, user documentation etc). An example screen capture is shown in FIG. 12.

Figure 13:
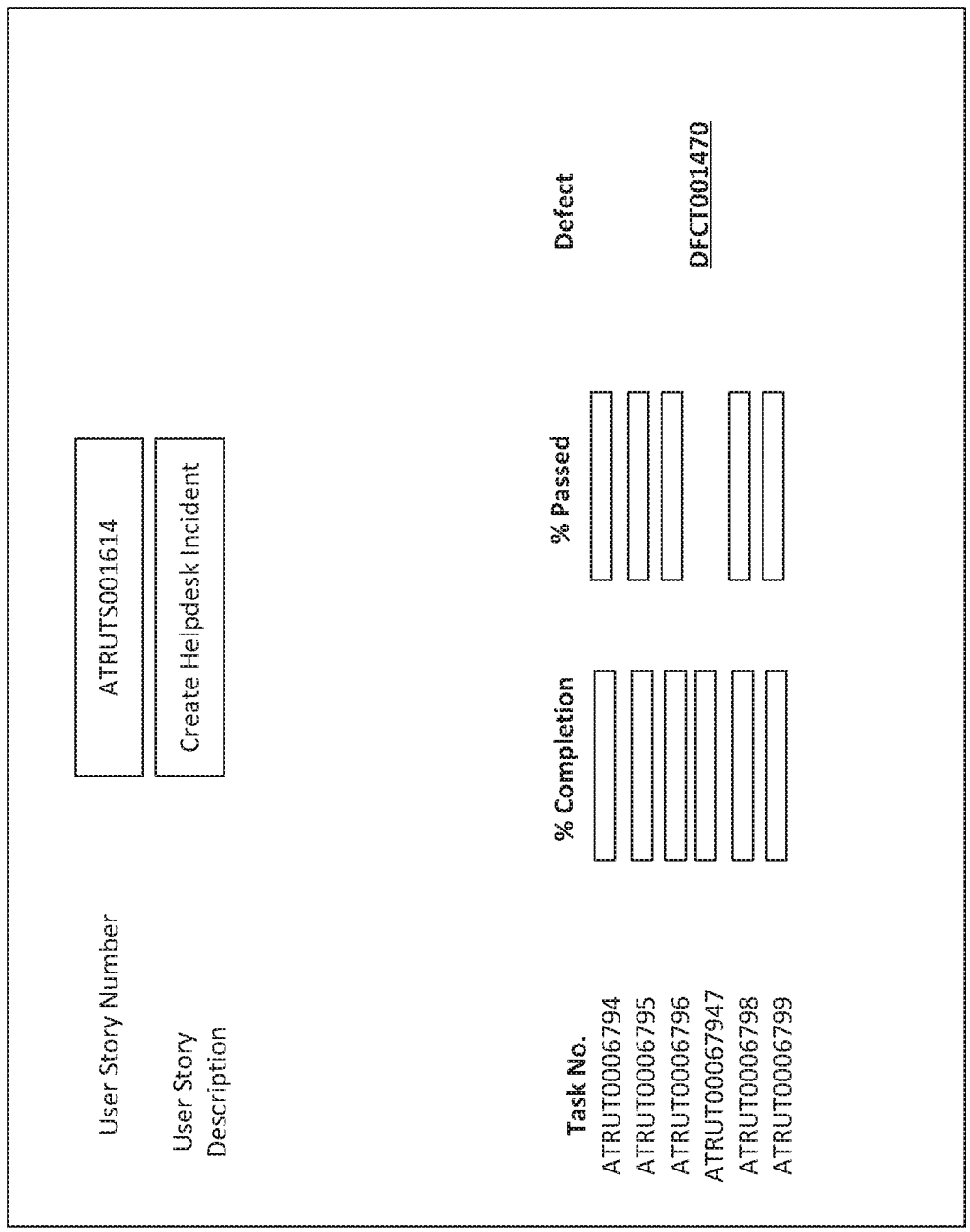

The tests themselves return success or failure results based on what user task it was told to do and what to check once it has done it. These results are recorded against the original user task instruction as shown in FIG. 13.

If the test fails actions can be taken such as an email sent to a designated person defined for this test run and optionally an SMS text is sent to them to notify them that a test has failed during execution. Defects are automatically logged for each failure, detailing the problem and details of the test and failure as shown in FIG. 14. Preferably, a screenshot may also be attached to the defect record showing the UI state at the time of the failure.

A dashboard may also display test results and success/failure rates for each test run as shown in FIG. 15.

It is to be appreciated that certain embodiments of the invention as discussed below may be incorporated as code (e.g., a software algorithm or program) residing in firmware and/or on computer useable medium having control logic for enabling execution on a computer system having a computer processor, e.g., a hardware processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A computer implemented functional behaviour test system for a target computer program comprising: a data repository encoding data defining user interface functionality of the target computer program, the data defining the user interface functionality being used to generate a user interface during execution of the target computer program; a processor configured by computer program code stored in the data repository to execute: a definition system to receive for the target computer program, a selection of a functional behaviour test definition, the definition system further being arranged to receive an input on one or more parameters for the selected functional behaviour test definition to define a functional behaviour test for the target computer program; a validation system to validate the functional behaviour test in dependence on the data defining user interface functionality and to store the validated functional behaviour test in a data repository; and a test interface system to provide access by a substantially automated execution environment to the validated functional behaviour test in the data repository for testing of the validated functional behaviour test against the target computer program.

2. The computer implemented functional behaviour test system of claim 1, wherein the functional behaviour test comprises a user scenario and is defined with respect to a user input, the functional behaviour test system being arranged to translate the user scenario into one or more actions to be performed by the substantially automated execution environment to simulate the user input and communicate said one or more actions to the substantially automated execution environment to test the target computer program.

3. The computer implemented functional behaviour test system of claim 2, further arranged to manipulate the one or more actions to be communicated to the substantially automated execution environment to cause non-standard execution associated of an aspect of the target computer program associated with the validated functional behaviour test.

4. The computer implemented functional behaviour test system of claim 3, wherein the non-standard execution comprises changing emphasis of user interface functionality when the target computer program is executed by the substantially automated execution environment to visually highlight the user interface functionality associated with the validated functional behaviour test when a user interface is rendered on a display.

5. The computer implemented functional behaviour test system of claim 4, wherein the functional behaviour test system is configured to store a screen capture of the visually highlighted user interface functionality in association with the validated functional behaviour test.

6. The computer implemented functional behaviour test system of claim 1, further comprising a machine learning unit configured to monitor user interaction with a live environment executing the target computer program and generate functional tests in dependence on the user interaction.

7. The computer implemented functional behaviour test system of claim 1, further comprising a documentation system arranged to translate one or more of the validated functional behaviour tests in the data repository into user-oriented documentation and to generate one or more documents on the target computer program using the user-oriented documentation.

8. The computer implemented functional behaviour test system of claim 7, further comprising a template repository, wherein each validated functional behaviour test is based on a template in the template repository having an associated natural language format, the documentation system being arranged to apply the natural language format to the validated functional behaviour test to generate the user-oriented documentation.

9. The computer implemented functional behaviour test system of claim 7, wherein the documentation system is arranged, in generating the user-oriented documentation, to combine the validated functional behaviour test with one or more results from testing the validated functional behaviour test against the target computer program.

10. The computer implemented functional behaviour test system of claim 9, wherein the one or more results include one or more screen captures of the target computer program being executed by the substantially automated execution environment.

11. The computer implemented functional behaviour test system of claim 1, wherein the definition system is arranged to access the data repository on acceptable parameters of the target computer program and constrain the input on the one or more parameters to one or more of the acceptable parameters.

12. The computer implemented functional behaviour test system of claim 1, further including an alarm system, the functional behaviour test system being arranged to repeatedly execute one or more of the validated functional behaviour tests, the arranged functional behaviour test system to generate an alarm upon a change in state of execution of the validated functional behaviour test from successful to unsuccessful.

13. The computer implemented functional behaviour test system of claim 7, further comprising computer program code configured to apply a natural language template to translate the respective one or more validated functional behaviour tests in a second data repository into user-oriented documentation.

14. The computer implemented functional behaviour test system of claim 13, further comprising computer program code to change emphasis of user interface functionality when the target computer program is executed by the substantially automated execution environment by visually highlight the user interface functionality associated with the validated functional behaviour test, the computer program code configured to use a natural language template further being configured to obtain a screen capture of the of the visually highlighted user interface functionality and incorporate the screen capture in the user-oriented documentation showing the visually highlighted user interface functionality.

15. A method for testing functional behaviour of a target computer program, the target computer program including data defining user interface functionality encoded in a data repository, the method including: receiving, for the target computer program, a selection of a functional behaviour test definition; receiving an input on one or more parameters for the selected functional behaviour test definition to define a functional behaviour test for the target computer program; validating the functional behaviour test in dependence on the data defining user interface functionality; storing the validated functional behaviour test in the data repository; and providing one of the validated functional behaviour tests to a substantially automated execution environment via an interface that translates the validated functional behaviour tests to instructions executable by the substantially automated execution environment against the target computer program for performance of the functional behaviour test.

16. A computer implemented functional behaviour test system comprising: a data repository encoding data on a plurality of validated functional behaviour tests, the data repository including a selection of a definition from a plurality of predetermined functional behaviour test definitions and one or more parameters for the selected functional behaviour test definition to define a functional behaviour test for a target computer program, the validated functional behaviour test being on a user scenario and being defined with respect to a user input to the target computer program; a processor configured to execute computer program code for executing a functional behaviour test system, including: computer program code configured to provide one of the validated functional behaviour tests to a substantially automated execution environment via an interface that translates the validated functional behaviour tests to instructions executable by the substantially automated execution environment against the target computer program for performance of the functional behaviour test.

17. The computer implemented functional behaviour test system of claim 16, wherein the substantially automated execution environment comprises a virtual environment configured to execute the target computer program, execute received instructions as simulated user inputs and provide data on output of the target computer program.

18. The computer implemented functional behaviour test system of claim 17, wherein the processor is configured to manipulate the instructions to be communicated to the substantially automated execution environment to cause non-standard execution associated of an aspect of the target computer program associated with the validated functional behaviour test.

19. The computer implemented functional behaviour test system of claim 18, wherein the non-standard execution comprises changing emphasis of user interface functionality when the target computer program is executed by the substantially automated execution environment to visually highlight the user interface functionality associated with the validated functional behaviour test when the user interface is rendered on a display.

20. The computer implemented functional behaviour test system of claim 16, wherein the processor is further configured to execute computer program code for executing a machine learning algorithm including:
    computer program code configured to monitor user interaction with a live environment executing the target computer program and generate functional tests in dependence on the user interaction.

* * * * *